Patented July 5, 1938

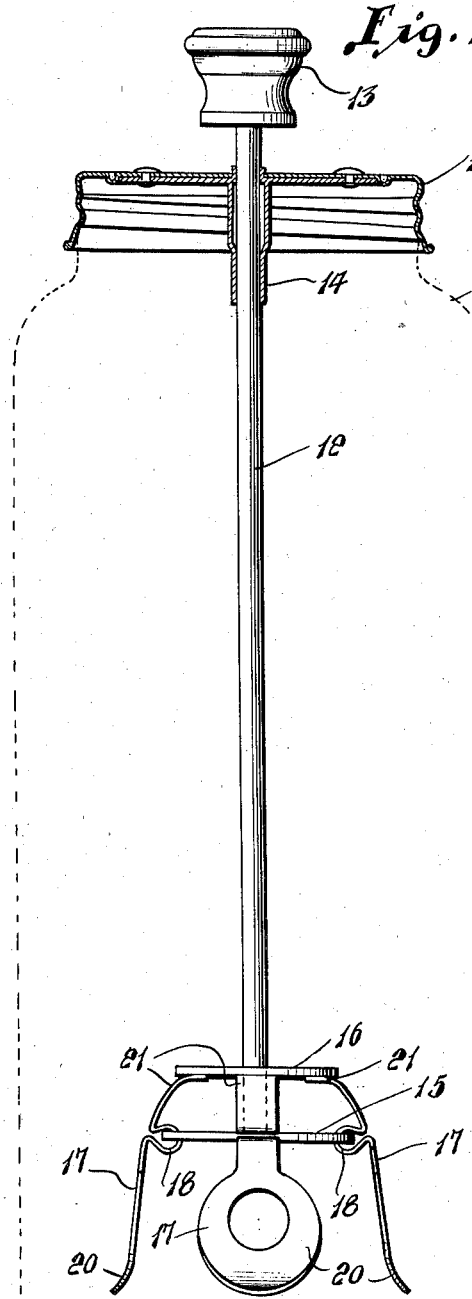
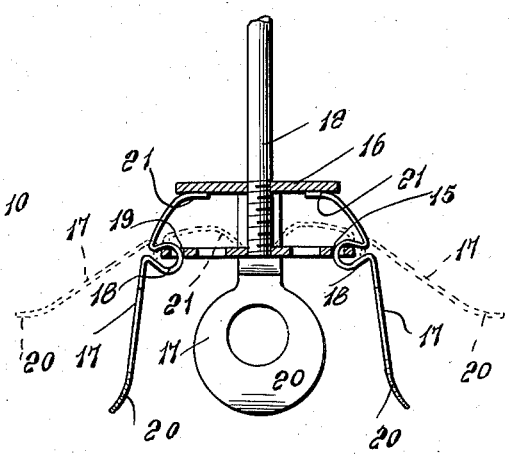
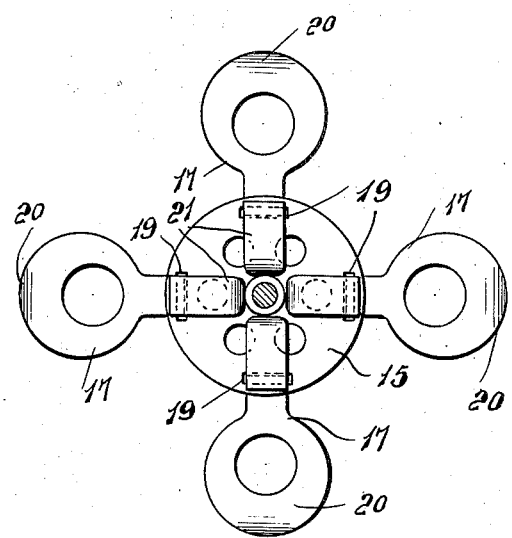

2,123,118

UNITED STATES PATENT OFFICE 2,123,118

LIQUID MIXER

William L. Osborn and Joseph H. Williams, Elwood, Ind.

Application May 27, 1937, Serial No. 145,160

3 Claims. (Cl. 259—124)

This invention relates to an improvement in mixers.

The object of this invention is to provide a portable liquid drink mixer adapted to operate in a Mason jar and to be slidably mounted in the jar cap.

Another object of the invention is to provide a portable churn of the reciprocating type, that may be either permanently connected to a threaded jar cap or which may be easily attached to the ordinary Mason jar cap.

A further object of the invention is to provide a churn provided with a plurality of paddle shaped agitating members adapted for movement in a vertical arc.

Other objects and advantages of the invention will become apparent from the specification of which the drawing forms a part, and wherein:—

Figure 1 is an elevational view of the device mounted in a Mason jar,

Figure 2 is a fragmentary elevational view partly in section illustrating the range of movement of the agitators, and Figure 3 is a bottom plan view of the agitators in assembled position.

Referring more particularly to the drawing wherein like reference characters designate like or corresponding parts in the different views, 10 is a Mason jar shown in dotted lines, and provided with a screw cap 11 in which is slidably mounted a rod 12 provided at its upper end with a handle or knob 13.

Cap 11 is shown provided with a sleeve 14 in which rod 12 is mounted, and which is adapted to form a guide for the rod 12 as it reciprocates. However, rod 12 can also be mounted in an opening in a cap 11 which is not provided with a sleeve 14.

To the lower end of rod 12 is secured disks 15 and 16 mounted in spaced relationship one above the other. The lower end of rod 12 is threaded, and disks 15 and 16 are provided with threaded openings to permit the adjustment of the space between the disks 15 and 16.

Agitators 17 are provided with offset loop portions 18 adapted to pivotally engage openings 19 in disk 15 to mount the agitators in spaced relationship around the disk 15. The lower ends of the agitators 17 are provided with enlarged paddle shaped portions 20 which are flared outwardly. The upper ends 21 of agitators 17 are bent inwardly and normally engage against the under face of disk 16.

In operation the device is slidably mounted as shown in Figure 1, and the jar 10 is filled with the ingredients to be mixed. Handle 13 is grasped and rod 12 is reciprocated in cap 11. As rod 12 moves upwardly the agitators 17 remain in their normal position as shown in Figure 1. As rod 12 moves downwardly the pressure of paddles 20 against the contents in jar 10 causes the paddles 20 to move outwardly to the position shown in dotted lines in Figure 2. The movement of paddles 20 is limited by the ends 21 engaging disk 16 and disk 15, as shown in full and dotted lines in Figure 2. Handle 13 can be removably connected to rod 12 so that it can be removed to permit the removal of rod 12 from cap 11.

It is to be understood that only the preferred embodiment of the invention has been shown, the right being reserved to make such changes and modifications as will not depart from the spirit and scope of the invention as claimed.

We claim as our invention:—

1. A mixer comprising a threaded rod, disks adjustably supported on the threaded portion of said rod, one of said disks being provided with a plurality of spaced openings, agitators pivotally engaging said spaced openings, said agitators being mounted to swing through an arc and having their upper ends bent inwardly to move between said disks to limit their movement thereby, and said disks being adjustable to vary the length of movement of said agitators.

2. A mixer comprising a rod, disks mounted in spaced relationship on said rod, one of said disks being provided with a plurality of spaced openings, agitators bent intermediate their ends to form a loop portion, said loop portion pivotally engaging the opening in said disk, the lower ends of said agitators being enlarged to form paddles, and the upper ends being bent inwardly to move between said disks to thereby limit the movement of said paddle portions.

3. In a mixer, a vertically reciprocating rod, plates adjustably mounted on said rod, one of said plates being provided with a plurality of spaced openings, and agitators pivotally mounted in said openings, intermediate of their ends, the upper ends of said agitators being bent to extend between said plates and to be limited in their movement thereby, the lower ends of said agitators being normally disposed substantially parallel to said rod, said lower ends being enlarged and flared outwardly at their lower edges causing the agitators to be opened by the downward movement of said rod.

JOSEPH H. WILLIAMS.
WILLIAM L. OSBORN.